June 5, 1923.

J. R. COOK

MOTOR BRUSH HOLDER

Filed Aug. 12, 1921

1,457,896

INVENTOR
Joel R. Cook
BY Davis Moerlin
ATTORNEYS

Patented June 5, 1923.

1,457,896

UNITED STATES PATENT OFFICE.

JOEL R. COOK, OF CLEVELAND, OHIO, ASSIGNOR TO DOMESTIC ELECTRIC COMPANY, OF CLEVELAND, OHIO, A CORPORATION OF OHIO.

MOTOR BRUSH HOLDER.

Application filed August 12, 1921. Serial No. 491,650.

*To all whom it may concern:*

Be it known that I, JOEL R. COOK, a citizen of the United States, residing at Cleveland, in the county of Cuyahoga and State of Ohio, have invented a certain new and useful Improvement in Motor Brush Holders, of which the following is a full, clear, and exact description, reference being had to the accompanying drawings.

This invention is directed to improvements in an electric motor of the small series type and is more particularly concerned with the provision of novel means for retaining the brushes in position on the commutator of the motor.

Considerable difficulty has been experienced with brushes of small series motors such as are commonly used in vacuum cleaners. The holder is usually comprised of a broached metallic tube adapted to retain a brush having a square or rectangular cross-section. The field winding of the motor is usually connected to the outer surface of the holder. The cross sectional dimensions of the brush are slightly less than the cross sectional dimensions of the broached opening in the holder; the brush thus being permitted to slide freely within the holder as it rests upon the commutator. In this arrangement the current flows from the field winding through the holder whence it passes to the brush and then into the commutator. The objection to this construction is that corrosion takes place between the brush surfaces and the supporting surfaces of the holder due to arcing when sufficient contact between the holder and the brush is not present to maintain substantially the same electric potential between the brush holder and the brush. The prevalence of this corrosion thus prevents the sliding movement of the brush within the holder with a resultant inefficient contact between the brush and the commutator.

The general object of my invention therefore, is the provision of a novel brush holder wherein a non-obstructed path is provided for the flow of the electric current from the field winding to the commutator.

Other objects will become apparent from the following description hereinafter set forth in connection with the accompanying drawings which illustrate a preferred embodiment of my invention, the essential characteristics being summarized in the claims.

Figure 1:
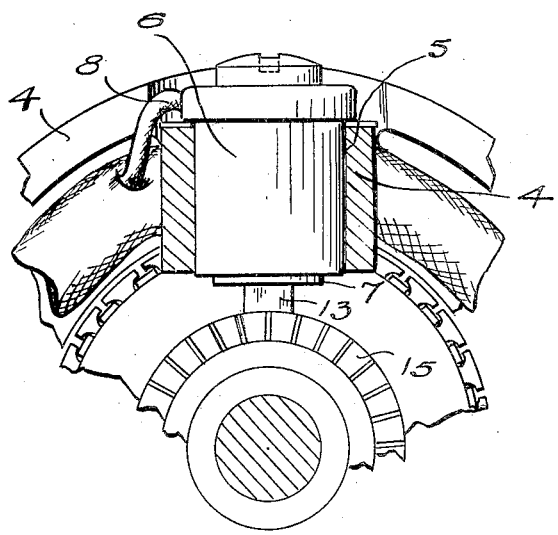
Figure 2:
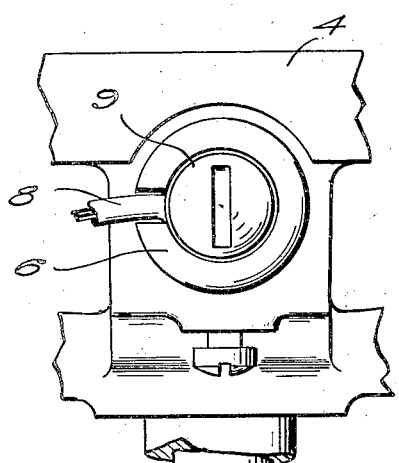
Figure 3:
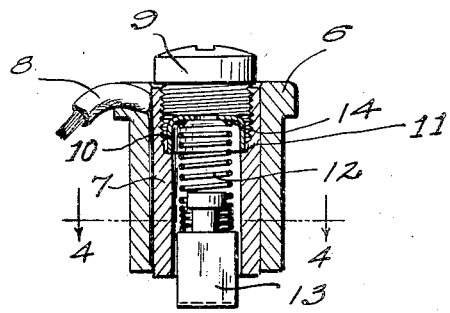
Figure 5:
Figure 4:
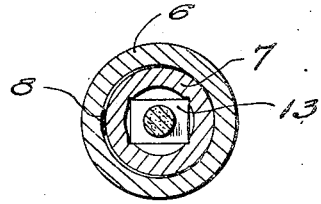

In the drawings, Fig. 1 is a cross sectional elevation of the commutator end of a small series motor; Fig. 2 is a fragmentary plan view of part of the motor which illustrates the position of the brush holder in the frame of the motor, while Fig. 3 is a cross sectional elevation of the brush holder; Fig. 4 is a transverse cross sectional view of the holder substantially along the line 4—4 of Fig. 3, while Fig. 5 is a perspective view showing the arrangement of the brush and means for electrically connecting the brush to the brush holder.

In small series motors such as are commonly used in vacuum cleaners, food mixers, etc., it has been customary to use a brush having transverse cross sectional dimensions which are slightly less in area than the dimensions of a broached hole formed in a metallic brush holder. The brush holder was usually closed by a removable metallic plug secured in the outer end of the brush holder which forms a seat for a spring member interposed between the inner end of the brush and the inner surface of the metallic plug. The field winding of the motor was usually connected directly to the outside of the metallic tubular holder; the current from the field winding would thus flow through the holder and the metallic plug member whence it may flow through the spring member and then through the brush.

Such a construction, while being electrically efficient, exposes the metallic conducting members to the touch of the operator of the device in which the motor is incorporated. This defect was overcome by constructing the metallic plug member from insulating material with the result that the current from the field winding has an indirect path to the brush as the only connection between the brush holder and the brush in this construction is along the broached surface of the brush holder and the sliding surface of the brush. Hence, an arcing takes place betwen the inner surface of the brush holder and the surface of the brush when there is a substantial difference in potential between them, and the brush holder is thus corroded thereby causing inefficient operation of the motor.

I have found that a very economical and efficient means for eliminating this difficulty may be obtained by restoring a direct path for the current from the field winding to the brush, and therefore I have constructed a brush holder having the usual insulating jacket 6 which is adapted to fit tightly in a suitable bored opening 5 in the motor frame 4 and also over the holder tube 7. The insulating jacket is usually cylindrical with a bore slightly larger than the outside diameter of the brush holder 7, so that the end of the field winding 8 may be held securely between the jacket and the outer surface of the holder by assembling the holder and jacket with the end of the field wire 8 wedged therebetween as shown in Fig. 4. A suitable plug member 9, formed of suitable insulating material, may be removably secured in the end of the brush holder 7.

To insure an unobstructed path for the current, I provide an auxiliary cup member 10 preferably of the form illustrated in Fig. 3, which may be adapted to be seated positively on a shoulder 11 formed on the inside of the brush holder 7.

A resilient member 12 may be retained in a compressed condition between the plug member 9 and the end of the brush 13 to obtain efficient contact pressure between the brush and the rotating commutator 15. It is quite essential, however, that contact be insured between the cup member 10 and the resilient member 12. I, therefore, prefer to weld or solder the end of this spring member directly to the inner surface of the cup member 10, as illustrated at 14 in Fig. 3.

The plug member 9 may be screwed into the brush holder, and upon the cup member 10 thereby positively securing the cup member in electrical contact with the brush holder. Any convenient means, such as a hooked wire, may be inserted in a suitable opening 16 formed in the member 10 for the removal of the brush. The inner end of the brush may have a rounded portion 17 adapted to be engaged by the spring member 12 where the brush and spring are removed.

The current from the field winding may thus have an unobstructed flow directly through the brush holder, the cup member 10, the resilient spring member 12, the brush 13 and thence into the commutator.

I have found that the cross section of the wire used in constructing the resilient member 12 need not be any greater than that of the wire used heretofore in constructing springs which served the single purpose of maintaining the brush in contact with the commutator. In fact, this spring member may be considerably weaker as less force is required to maintain the brush in proper contact with the commutator, as no undue friction will now be present between the brush holder and the brush.

It is to be understood that the resilient member 12 is not adapted to carry all of the current passing from the field winding to the commutator, but is adapted to carry sufficient current to maintain a very low difference of potential between the brush holder and the brush. Hence, the major portion of the current will pass from the brush holder directly to the brush through the contacting surfaces therebetween.

I have found that it is only at certain instants that the proper conductive contact is lost between the brush and the brush holder during which periods an excessive flow of current passes through the auxiliary member 12. These periods are of such short duration, however, that no material overheating will result from utilizing the spring member as a conductive means for maintaining the low difference in potential between the brush and the brush holder.

From the foregoing description, it is to be seen that by the incorporation of simple means within the brush holder, my device will not in any way interfere with the motor frame and brush standards which prevail in the industry. Furthermore, the arcing between the holder and brush which was encountered in the manufacture of small motors when all of the electrically conductive members were covered by insulating material may thus be obviated.

Having thus described my invention what I claim is:—

1. In a motor brush holder, the combination of a slidable brush, a metallic tubular holder therefor closed at one end by an insulating plug, and electrically conductive means interposed between the insulating plug and the end of the brush whereby an electrical path is provided from the holder to the brush independent of the contacting surfaces between the brush-holder and the brush, said plug serving to clamp a portion of said conductive means in positive contact with the tubular holder.

2. In a motor brush holder having an annular shoulder formed therein, the combination of a brush having a rectangular cross section slidably mounted within the brush holder, a metallic cup member adapted to be maintained in positive contact on said shoulder by an insulating plug removably secured to one end of the holder, and an electrically conductive resilient member interposed between the inner surface of the cup member and the inner end of the brush.

3. In a motor brush holder, the combination of a slidable brush, a guide tube therefor, a plug formed of insulating material removably secured in one end of the holder, and electrically conductive means positioned within the holder for maintaining an electrical connection between the holder and the brush, said means being maintained in positive contact with the tube.

4. In a motor brush holder, the combination of a brush, a metallic holder in slidable contact with the brush and closed at one end by an adjustable plug formed of insulating material, and electrically conductive means maintained in positive contact with the holder and the end of the brush by the insulating plug, whereby an electrical path is provided from the holder to the brush independent of the contacting surfaces between the brush holder and the brush.

5. In an electric motor of the class described, the combination of a brush holder having an annular shoulder formed therein, a brush slidably mounted within the brush holder, an adjustable plug formed of insulating material closing one end of the holder, a cup member adapted to be maintained in positive contact on said shoulder by said plug, and an electrically conductive resilient member interposed between the inner surface of the cup member and the end of the brush adapted to maintain the brush in contact with the commutator of the motor while conducting an electric current thereto.

6. In an electric motor of the class described, the combination of an insulated brush holder secured to the motor frame, a commutator brush slidably mounted therein, an insulated plug closing one end of the holder and a resilient member secured to the brush holder and adapted to maintain the brush in yieldable contact with the motor commutator.

7. The combination of a commutator brush, a hollow metallic brush holder secured to the motor frame, means for insulating the holder frame, means for connecting the field winding of the motor to the brush holder, and means for electrically connecting the brush holder to the brush independent of the contact surfaces between the brush and holder, including a resilient member adapted to bear on the end of the brush and an insulated plug member closing one end of the holder and adapted to secure said resilient member to the holder.

8. The combination of a tubular metallic brush holder, a commutator brush slidably mounted therein, and an insulating plug member closing one end of the holder adapted to secure means for maintaining a low difference of potential between the holder and brush to the inner wall of the holder.

9. A motor brush holder having a guideway formed therein, a brush, a spring in contact with the brush and holding means secured to the spring and held in electrical contact with the holder by an insulating member.

10. In a brush holder adaptable for use on vacuum cleaner motors, the combination of a tubular brush holding member having grooves formed longitudinally in the inner surfaces thereof a brush mounted within the tube and contacting with only the grooved portions of the tube, resilient means for electrically connecting the tube to the brush, said means being out of contact with the inner wall of the tube, and an insulating plug member positively securing said means in conductive contact with the tube and closing the end thereof.

In testimony whereof, I hereunto affix my signature.

JOEL R. COOK.